(12) United States Patent
Hilsebecher et al.

(10) Patent No.: US 7,663,534 B2
(45) Date of Patent: Feb. 16, 2010

(54) RADAR SENSOR AND METHOD FOR ANALYZING OBJECTS

(75) Inventors: Joerg Hilsebecher, Hildesheim (DE); Joachim Selinger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 424 days.

(21) Appl. No.: 11/630,486

(22) PCT Filed: Apr. 12, 2005

(86) PCT No.: PCT/EP2005/051605
§ 371 (c)(1),
(2), (4) Date: Dec. 22, 2006

(87) PCT Pub. No.: WO2005/124391
PCT Pub. Date: Dec. 29, 2005

(65) Prior Publication Data
US 2009/0201193 A1 Aug. 13, 2009

(30) Foreign Application Priority Data
Jun. 22, 2004 (DE) ........................ 10 2004 030 133

(51) Int. Cl.
*G01S 13/58* (2006.01)
(52) U.S. Cl. ..................................... 342/109
(58) Field of Classification Search ................. 342/109, 342/111, 112, 70
See application file for complete search history.

(56) References Cited
U.S. PATENT DOCUMENTS

| | | | |
|---|---|---|---|
| 3,149,326 A | 9/1964 | Naidich | |
| 5,768,131 A | 6/1998 | Lissel et al. | |
| 5,963,162 A | 10/1999 | Mochizuki et al. | |
| 5,963,163 A | 10/1999 | Kemkemian et al. | |
| 6,606,052 B1 * | 8/2003 | Miyahara | ..................... 342/70 |

FOREIGN PATENT DOCUMENTS

| | | |
|---|---|---|
| DE | 195 38 309 | 4/1997 |
| EP | 0863409 | 9/1998 |

(Continued)

OTHER PUBLICATIONS

"Adaptive Fahrgeschwindigkeitsregelung ACC" [Adaptive Cruise Control ACC], published by Robert Bosch GmbH, Apr. 2002, pp. 4-80, (ISBN-3-7782-2034-9).

(Continued)

*Primary Examiner*—Dan Pihulic
(74) *Attorney, Agent, or Firm*—Kenyon & Kenyon LLP

(57) ABSTRACT

A method and a radar sensor for transmitting frequency-modulated transmitted signals and receiving partial waves reflected by objects in the sensor detection range. A frequency shift of the received signal relative to the transmitted signal is determined for each object reflecting in each frequency ramp, it being possible to determine the relative speeds and the distances of the detected objects from the combination of frequency shifts of a plurality of ramps. The objects detected in preceding measurement cycles are stored in a memory, their relative speed and their distance being computed in advance for a future measurement cycle. The expected frequency shifts are determined and the frequency shifts of a plurality of ramps are combined in order to determine the relative speeds and the distances for objects that have not yet been stored in the memory.

11 Claims, 3 Drawing Sheets

FOREIGN PATENT DOCUMENTS

| | | |
|---|---|---|
| EP | 0 939 322 | 9/1999 |
| JP | 8509059 | 9/1996 |
| JP | 10253753 | 9/1998 |
| JP | 11038129 | 2/1999 |
| JP | 2006226772 | 8/2006 |
| WO | 2004/029650 | 4/2004 |

OTHER PUBLICATIONS

Rohling H et al: "Waveform design principles for automotive radar systems" Proceedings of CIE. International Conference on Radar. Oct. 15, 2001, Seiten 1-4, XP002239085 das ganze Dokument.

"Adaptive Fahrgeschwindigkeitsregelung ACC" [Adaptive Cruise Control ACC], published by Robert Bosch GmbH, Apr. 2002 (ISBN-3-7782-2034-9).

* cited by examiner

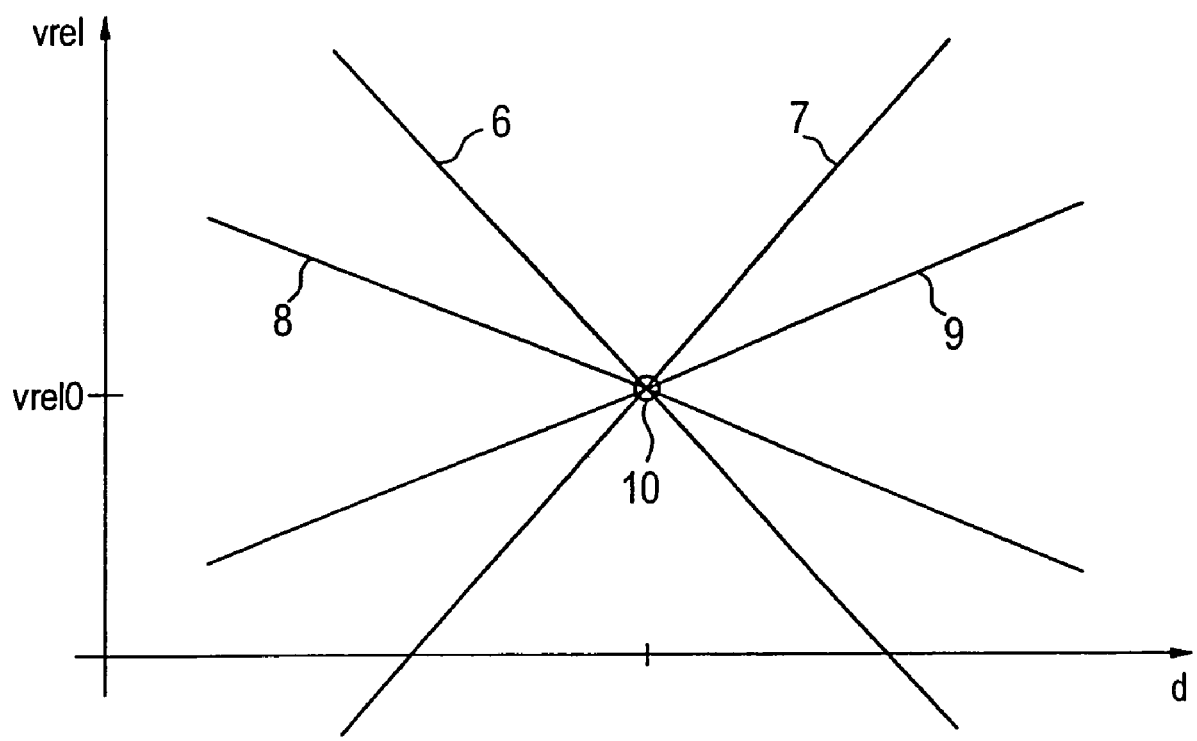

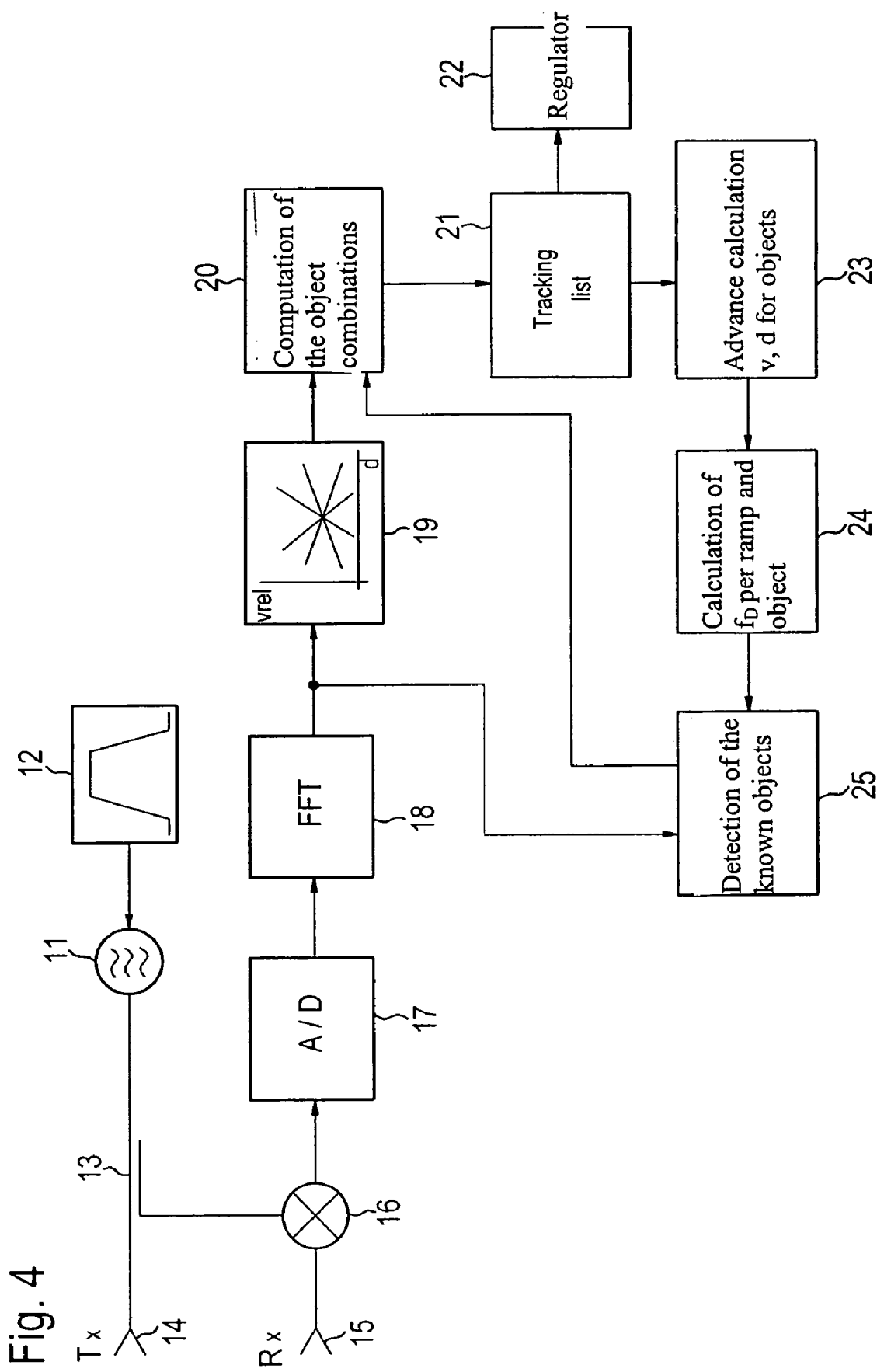

RADAR SENSOR AND METHOD FOR ANALYZING OBJECTS

FIELD OF THE INVENTION

The present invention relates to a method and a radar sensor, the radar sensor transmitting frequency-modulated transmitted signals and receiving partial waves reflected by objects in the sensor detection range, a frequency shift of the received signal relative-to the transmitted signal being determined for each object reflecting in each frequency ramp, it being possible to determine the relative speeds and the distances of the detected objects from the combination of frequency shifts of a plurality of ramps, the objects detected in preceding measurement cycles being stored in a memory, their relative speed and distance being computed in advance for a future measurement cycle, the expected frequency shifts being determined and the frequency shifts of a plurality of ramps. being combined in order to determine the relative speeds and distances for objects that have not yet been stored in the memory.

BACKGROUND INFORMATION

The publication "Adaptive Fahrgeschwindigkeitsregelung ACC" (Adaptive Cruise Control ACC), published by Robert Bosch GmbH, April 2002 (ISBN-3-7782-2034-9) discusses a radar sensor and a method for operating this radar sensor, frequency-modulated radar signals being transmitted and partial waves reflected by objects within the sensor detection range being received. The mixing of the transmitted and received signals gives rise to frequency signals representing a linear combination of relative speed and distance of the detected object. The use of a plurality of rising and falling frequency ramps makes it possible to superpose a plurality of linear combinations containing the relative speed and the distance of the object, resulting in an unambiguous point of intersection of these straight lines which represents the actual relative speed and the actual distance of the object. The use of a plurality of rising and falling frequency ramps having different slopes makes it possible to resolve any ambiguities occurring even if a plurality of objects are present in the sensor detection range.

A disadvantage in this related art may be that when a rising and a falling frequency ramp having a first slope and a rising and falling frequency ramp having a second slope are used per measuring cycle, i.e., a total of four frequency ramps is used, the computing complexity for determining the relative speed and the distances of a plurality of detected objects makes it necessary to have enormous computing capacity for analyzing the linear combinations. If, for example, a total of eight objects is detected within a measurement cycle having four frequency ramps, then 8*4=32 straight lines and $8^4$=4096 straight line intersections result, which must be checked with regard to objects actually present or with respect to apparent objects, since it is not known in advance which straight-line points of intersection represent real objects. If the number of detected objects increases, the computing complexity increases accordingly by a power of four, making expensive and complex evaluation devices necessary.

SUMMARY OF THE INVENTION

An object of the present invention is to provide a method and a device for evaluating radar sensor signals making it possible to ascertain the relative speed and the distance of detected objects rapidly, unambiguously and reliably even if the number of detected objects is large. The use of the method according to the present invention makes it possible to use more cost-effective computing resources that make an unambiguous assignment possible even if the computing capacity is low. According to the present invention, this is achieved by the features of the independent claims. Advantageous enhancements and embodiments are described in the dependent claims.

Advantageously, in order to form the frequency ramps, the carrier frequency is increased and/or reduced in a linear manner over time so that both rising and falling frequency ramps arise between temporally constant frequency ranges.

It is furthermore advantageous that the frequency ramps have different steepnesses. The use of frequency ramps having varying steepnesses makes it possible to obtain in the analysis in a vrel-d diagram straight lines which have different steepnesses, thereby making it possible to resolve ambiguities when a plurality of objects is detected in the sensor detection range.

It is further advantageous that a rising and a falling frequency ramp is provided for every steepness of a frequency ramp. This makes it possible to implement a frequency modulation pattern, in which a first steeply rising frequency ramp is present, after which a falling frequency ramp having the same steepness as the first frequency ramp in terms of amount is to be provided; furthermore a third frequency ramp is to be provided which is also rising, however, at a steepness that is gentler than the first or second frequency ramp, and a fourth frequency ramp is to be provided, during which the transmitted frequency falls, and which has the same steepness in terms of amount as the third frequency ramp. For each detected object, this results in a vrel-d straight line for each frequency ramp in the vrel-d diagram, making it possible to determine distance d and relative speed vrel of the detected object using the common point of intersection of the four corresponding straight lines.

It is further advantageous that the detected objects are stored in the memory in a tracking list. The storage of the detected objects in the tracking list as well as their associated data makes it possible to select from the detected objects a suitable target object which is used for the adaptive cruise control of the host vehicle and it is possible to feed the corresponding data to the adaptive cruise controller.

It is further advantageous that distance d and relative speed vrel for the objects stored in the memory are computed in advance using a differential equation, making it possible to determine new distance d and new relative speed vrel for the next measurement cycle in advance at a very high level of accuracy.

It is further advantageous that a fast Fourier transformation is performed to determine the relative speed and the distances of the objects from the frequency shifts in that the transmitted and received signal mixed using the reception mixer, the transmitted and received signal being subsequently digitized, is transformed into the frequency range, making it possible to determine frequency peaks from it at a characteristic frequency $f_D$.

It is further advantageous that the frequency shift is ascertained by using a mixture of the transmitted signal with the received signal. To this end, it is suggested to use a reception mixer, for example in the form of a ring mixer having non-linear demodulation diodes at its output gates.

Of particular importance is the implementation of the method according to the present invention in the form of a control element which is provided for a control unit of an adaptive distance or cruise control system of a motor vehicle. In this connection, a program is stored on the control element, the program being executable on a computer, in particular on a microprocessor or signal processor and being suitable for performing the method according to the present invention. In this case, the present invention is therefore implemented by a program stored on the control element, so that this control element provided with the program represents the present invention in the same way as the method which the program is suitable for executing. An electric memory medium such as a read-only memory may be used in particular as the control element.

Further features, possible applications, and advantages of the present invention are derived from the following description of exemplary embodiments of the present invention which are depicted in the figures of the drawing. All features described or illustrated by themselves or in any desired combination represent the object of the present invention, regardless of their combination in the claims or their references, and regardless of their wording in the description or illustration in the drawing.

BRIEF DESCRIPTION OF THE DRAWINGS

FIG. 3 shows a relative speed-distance diagram, the determined vrel-d straight lines being drawn for determining the distance and the relative speed of the object.

FIG. 4 shows a schematic block diagram of an embodiment of the present invention.

DETAILED DESCRIPTION

Figure 1:
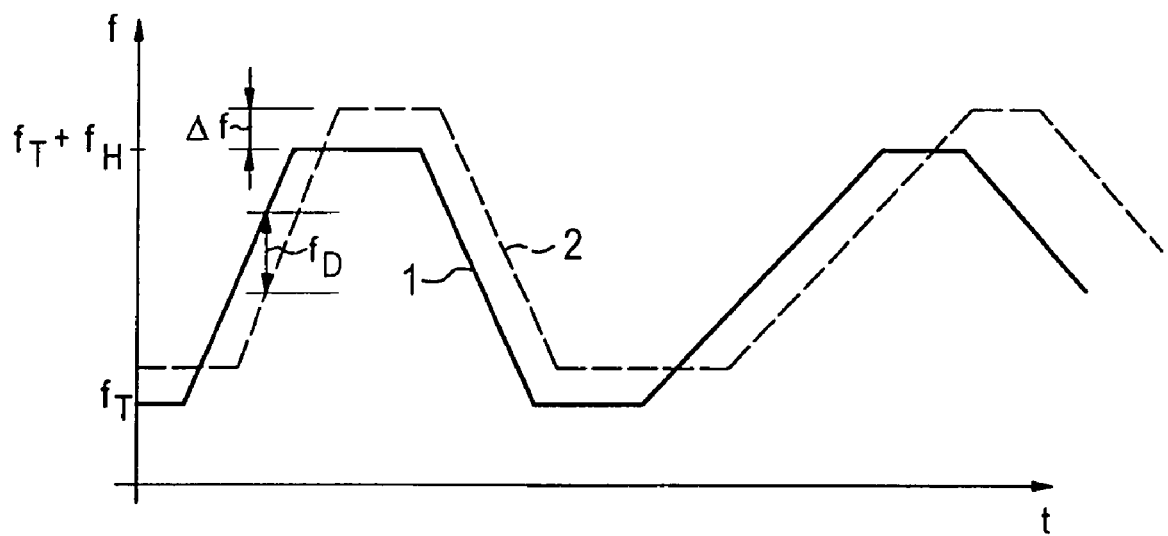
FIG. 1 shows an exemplary modulation pattern according to which the transmission frequency is changed as a function of time.

FIG. 1 shows a frequency-time diagram which shows an example of the curve of transmitted signal 1 and of received signal 2 over time. Transmitted signal 1, which is shown by the continuous line, rises starting from a carrier frequency $f_T$ in the form of a first frequency ramp to frequency $f_T+f_H$ and falls back again to original carrier frequency $f_T$ in a second frequency ramp, for example, after a specific waiting time at frequency $f_T+f_H$. In this connection, in terms of amount, the falling ramp has the same slope as the rising ramp.

Subsequently, a rising and a falling ramp are repeated which, starting from carrier frequency $f_T$, also rise by frequency deviation $f_H$. These third and fourth frequency ramps have a gentler slope than the preceding rising and falling frequency ramps, the third rising ramp and the fourth falling ramp in turn having the same slopes in terms of frequency level. This gives rise to a ramp-shaped frequency-modulated transmitted signal 1, which is transmitted from a transmitting antenna, is reflected by objects within the sensor detection range, and the reflected partial waves of which may be received again by a receiving antenna. As a result of the transit time required by the transmitted signal for the distance to the object and back again, received signal 2 undergoes a time lag along the t-axis and a frequency shift relative to transmitted signal 1 as a result of the Doppler effect of the moved object, whereupon received signal 2 is delayed and also undergoes a time lag and a frequency shift relative to transmitted signal 1. In this connection, the frequency shift due to the Doppler effect constitutes difference $\Delta f$ and would be measurable only in areas of constant transmission frequency between the ramps. During rising or falling ramps, shift $f_D$ occurs between transmitted signal 1 and received signal 2, shift $f_D$ being caused by the transit time of the transmitted signal and by the Doppler effect of the moved object. The knowledge of frequency shift ($f_D$) during a ramp therefore does not make it possible to unambiguously determine distance d or relative speed vrel. To this end, received signal 2 is mixed with instantaneous transmitted signal 1 using a reception mixer, giving rise to a frequency peak which is shown, for example, in FIG. 2. From frequency $f_D$ of this frequency peak, which arises as a result of the frequency difference between received signal 2 and transmitted signal 1, it is however possible to specify a combination of distances d and relative speed vrel, which are possible due to frequency shift ($f_D$). Consequently, a linear combination is derived from frequency shift $f_D$ with respect to distance d and relative speed vrel, which delivers no clear values.

Figure 2:
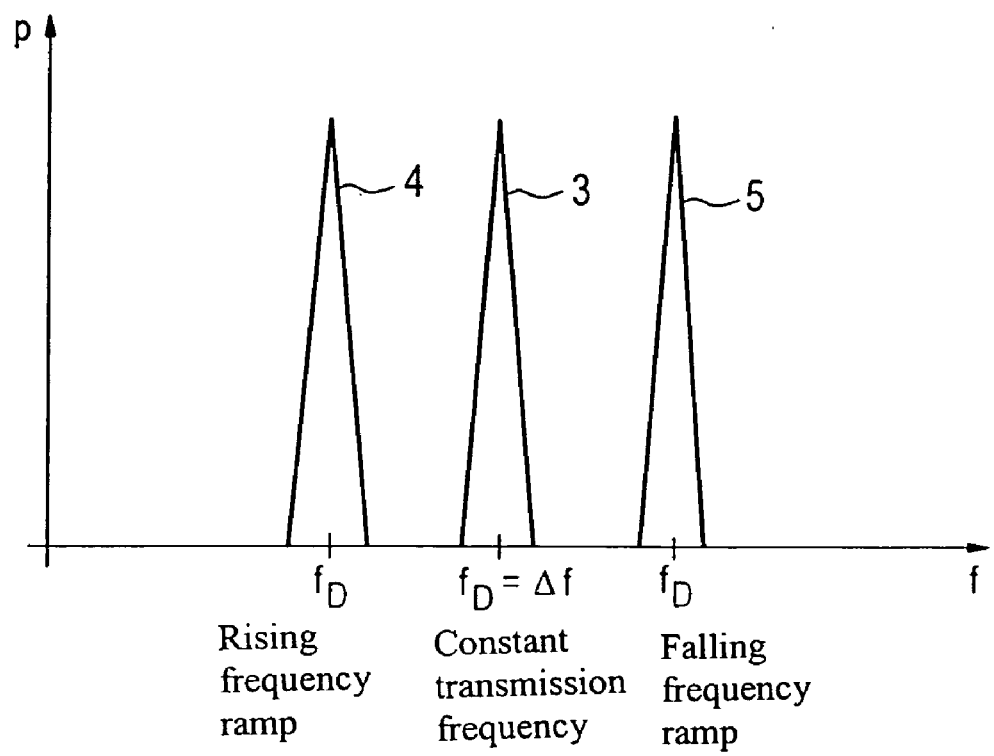
FIG. 2 shows a frequency spectrum in which exemplary frequency peaks are depicted, which arise by mixing the transmitted signal with the received signal.

The output of frequency peaks due to the mixing of received signal 2 and transmitted signal 1 as a function of frequency f is plotted in FIG. 2. A first frequency peak 3 is plotted, which has a frequency shift $f_D=\Delta f$, representing the mixer output signal which is measurable during constant transmission frequencies. If an object is detected during a rising frequency ramp, in the case of a slower object approaching the host vehicle, frequency peak $f_D$ is shifted to lower frequencies as is shown by signal 4. If the same object is measured during a falling frequency ramp, frequency peak 5 shifts to greater frequencies. The determination of the possible combinations of distance d and relative speed vrel during a rising ramp results in a falling straight line in a relative speed-distance diagram as shown in FIG. 3, which shows all combinations of distance and relative speed possible due to measured frequency $f_D$ as a straight line. If the same object having the same distance and same relative speed is measured during a falling frequency ramp, this results in another straight line having a slope with an opposite sign, as is shown, for example, in FIG. 3 as straight line 7. The point of intersection of both vrel-d straight lines 6, 7 in this case is the combination of distance d0 and relative speed vrel0, which the detected object actually has. If a plurality of objects is detected during rising or falling frequency ramps, this results in a plurality of rising and falling straight lines 6, 7 and it is not possible to determine unambiguously which points of intersection of these straight lines represent actual objects because every falling straight line 6 has a plurality of points of intersection with a plurality of rising straight lines 7. In order to resolve this ambiguity, the third and fourth frequency ramp is used, which also includes a rising and a falling frequency ramp, both frequency ramps having a different slope from the first and second frequency ramp. This results in additional straight lines 8, 9 whose slopes also have gentler slopes in terms of amount in the vrel-d diagram than straight lines 6, 7. These additional straight lines 8, 9 cross straight lines 6, 7, which are steeper in terms of amount, at the same point 10 if this point is a real object. If a point of intersection 10 is a point of intersection 10 that does not represent a real object but instead only arises through additional points of intersection of the straight lines, i.e., an apparent target, the pairs of straight lines having steeper and flatter slopes do not all cross one another at this point. The use of rising and falling frequency ramps having different steepnesses produces a multitarget capability of the radar sensor.

Additional points of intersection of the straight lines in which only two straight lines cross are therefore classifiable as apparent targets and are not relevant for the analysis. Such an analysis of the frequency shift for determining distance d0 and relative speed vrel0 is trivial in the case of a single detected object or two detected objects. If, however, many objects are detected by the radar sensor, for example, six frequency peaks during ramp 1, seven frequency peaks during ramp 2, eight frequency peaks during ramp 3 as well as nine frequency peaks during ramp 4, a total of 6*7*8*9=3024 straight line points of intersection are produced in the vrel-d diagram according to FIG. 3, the analysis of which requires enormous computing capacity. Accordingly, it may be assumed that in a linear increase in the number of detected objects, the computing complexity for analyzing straight line points of intersection 10 increases by a power of four, as a result of which the computing capacity of the analysis computer may be rapidly exhausted if the number of detected objects is large. This may be improved by performing the analysis of the straight line points of intersection according to FIG. 3 only for the objects that were not detected in preceding measurement cycles and accordingly are not stored in a tracking list. The tracking list may be, for example, the list from which the adaptive cruise controller obtains its data with respect to the objects of regulation. FIG. 4 shows a radar sensor having a frequency regulation 12 which, for example, specifies the ramp function for the transmission frequency. These control signals are forwarded to a voltage-controlled oscillator (VCO) 11 which generates a transmitted signal which is changed in the form of a ramp between lower carrier frequency $f_T$ and upper carrier frequency $f_T+f_H$ in the form of a ramp having the described slopes. This transmitted signal is forwarded to a transmitting antenna 14 which emits the transmitted signal in the direction of the objects to be detected. Furthermore a coupler 13 is provided which decouples a portion of the transmission capacity and feeds it to a mixer 16, which may advantageously be designed as a ring mixer. Furthermore, the partial waves received by receiving antenna 15, which are the transit time and Doppler-shifted transmitted signals, are fed to mixer 16. Mixer 16 now mixes the instantaneous transmitted and received signals and performs a demodulation using mixer diodes attached to it. This demodulated mixer signal is forwarded to a downstream analog-digital converter in which the signal is digitized and made available for further processing. Furthermore, the received signal is sent to a Fourier transformation 18 in which the signal, which is present in the time range, is transformed into the frequency range and accordingly may be analyzed in the form of frequency peaks as shown in FIG. 2. In another evaluation device 19, these frequency peaks are converted into straight lines of a relative speed-distance diagram, each straight line rising for a possible combination of distance and relative speed as a consequence of a frequency peak. Accordingly, one frequency peak and thus one straight line is generated per ramp for each object. From the points of intersection of these straight lines, actual object distances do and relative speeds vrel0 are ascertained by ascertaining straight line points of intersection 10, in which a vrel-d straight line of a steep, rising ramp, a vrel-d straight line of a steep, falling ramp, a vrel-d straight line of a flat, rising ramp and a vrel-d straight line of a flat, falling ramp intersect. This analysis of the straight line points of intersection and accordingly the ascertaining of the actual object combinations take place in block 20, whereupon the detected objects including their associated data, for example, their distance do, their relative speed vrel0 and possibly their azimuthal angle phi are stored in a tracking list 21. From this tracking list are fed to a regulator 22 which performs the control algorithm for an adaptive cruise control. Since the calculation of the object combinations in block 20 requires enormous computing complexity, according to the present invention the tracking list is further processed by calculating in advance the speed to be expected for each of the objects noted therein as well as the relative speed to be expected for the subsequent measurement cycle. Because not only the latest measurement is stored in tracking list 21, but instead it is possible to store a plurality of preceding measurement values, it is possible to estimate the change of the distance and the relative speed of the individual objects in advance using a movement-differential equation. The distances and relative speeds of the known objects thus determined in block 23 are converted into expected differential frequencies $f_D$ in block 24, representing the mixer output signals in the form of frequency peaks according to FIG. 2, which are to be expected in the next measurement cycle. In the next measurement cycle, the detected frequency peaks present at the output of Fourier transformation device 18 are additionally fed to a block 25, the differential frequency values $f_D$ of block 24 computed in advance also being fed to block 25. The comparison of the frequency peaks computed in advance and the frequency peaks actually measured makes it possible to detect the objects already stored in tracking list 21 because their frequency peaks already computed in advance have only slight deviations from the detected frequency peaks of the new measurement. If such frequency peaks computed in advance are actually detected, this is reported to computing device 20 which computes the actual object combinations, whereupon it need only analyze the straight line points of intersection from vrel-d diagram 19 which stem from objects that have not yet been stored in tracking list 21. Accordingly, it is only necessary to compute the distance and the relative speed of newly detected objects, which also reduces the computing complexity needed to compute these new objects by a power of four. As a result, it is possible to reduce the computing complexity significantly, in particular for the detection of a large number of objects without a concomitant reduction in detection reliability since the number of newly added objects does not change abruptly. According to the present invention, it is still also possible to enter only those objects into memory 21 that are detected over a minimum number of measurement cycles, so that reflections occurring only briefly due to measurement errors or apparent targets are not considered as actual objects.

What is claimed is:

1. A radar sensor comprising:
   a transmitting and receiving arrangement to transmit frequency-modulated transmitted signals and to receive partial waves reflected by objects in a sensor detection range;
   a determining arrangement to determine a frequency shift of a received signal relative to a transmitted signal for each reflecting object, and to determine relative speeds and distances of detected objects from a combination of frequency shifts of different modulation functions; and
   a memory, wherein objects detected in preceding measurement cycles are stored in the memory, their relative speed and their distance being determined in advance for a future measurement cycle, and wherein expected frequency shifts are determined and frequency shifts of different modulation functions are combined to determine relative speeds and distances for objects that have not been stored in the memory.

2. The radar sensor of claim 1, wherein the modulation function includes a frequency ramp.

3. The radar sensor of claim 2, wherein a carrier frequency is at least one of increased and reduced in a linear manner over time to form the frequency ramps.

4. The radar sensor of claim 1, wherein the modulation functions have different steepnesses.

5. The radar sensor of claim 1, wherein a rising and a falling frequency ramp is provided for every steepness of a frequency ramp.

6. The radar sensor of claim 1, wherein the detected objects are stored in the memory in a tracking list.

7. The radar sensor of claim 1, wherein the distances and the relative speeds for the objects stored in the memory are computed in advance using a differential equation.

8. The radar sensor of claim 1, wherein the frequency shifts of a plurality of ramps are combined by superposing straight lines associated with the frequency shifts in a distance-relative speed diagram and rising points of intersection are analyzed.

9. The radar sensor of claim 1, wherein a fast Fourier transformation is performed to determine the relative speeds and the distances from the frequency shifts.

10. The radar sensor of claim 1, wherein the frequency shift is determined by mixing the transmitted signal with the received signal.

11. A method for determining distances and relative speeds of objects located in a detection range of a radar sensor, the method comprising:

transmitting, by the radar sensor, frequency modulated transmitted signals;

receiving, by the radar sensor, partial waves reflected by the objects;

determining, by a determining arrangement of the radar sensor, a frequency shift of a received signal relative to a transmitted signal for each reflecting object;

determining, by the determining arrangement, the relative speeds and the distances of detected objects from a combination of frequency shifts of a plurality of ramps; and storing the detected objects, which are detected in preceding measurement cycles, in a memory device;

wherein the relative speeds and the distances of the detected objects are determined in advance for a future measurement cycle, and expected frequency shifts are determined and the frequency shifts of varied modulation functions are combined to determine the relative speeds and the distances for objects that have not been stored in the memory device.

* * * * *

UNITED STATES PATENT AND TRADEMARK OFFICE
CERTIFICATE OF CORRECTION

PATENT NO.       : 7,663,534 B2                                              Page 1 of 1
APPLICATION NO. : 11/630486
DATED            : February 16, 2010
INVENTOR(S)      : Hilsebecher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 480 days.

Signed and Sealed this

Thirtieth Day of November, 2010

David J. Kappos
*Director of the United States Patent and Trademark Office*